United States Patent [19]

Midorikawa

[11] 4,301,597
[45] Nov. 24, 1981

[54] DIPSTICK

[75] Inventor: Minoru Midorikawa, Koganei, Japan

[73] Assignee: Nissan Motor Company, Limited, Yokohama, Japan

[21] Appl. No.: 46,686

[22] Filed: Jun. 8, 1979

[30] Foreign Application Priority Data

Jun. 23, 1978 [JP] Japan .............................. 53-86251[U]

[51] Int. Cl.³ .............................................. G01F 23/04
[52] U.S. Cl. .............................................. 33/126.7 R
[58] Field of Search ..................... 33/126.7 R, 126.7 A

[56] References Cited

U.S. PATENT DOCUMENTS 1,976,434 10/1934 Claus .............................. 33/126.7 R
2,254,662 9/1941 Naples et al. .................. 33/126.7 R
2,705,372 4/1955 Cornell ........................... 33/126.7 R Primary Examiner—William D. Martin, Jr.

[57] ABSTRACT

A dipstick is formed of a single length of wire and comprises a generally straight main body and a loop-shaped handle portion. The wire is circular in cross section, relatively small in diameter and possesses a relatively high resilience such that the main body can resiliently flex in all directions to follow a complexly curved dipstick guiding conduit. The main body has a pair of axially spaced and radially projected stopper portions. The handle portion extends from the main body and terminates in an end which is wound round the main body between the stopper portions such that the end of the handle portion is prevented from relative movement in the axial direction of the main body.

1 Claim, 10 Drawing Figures

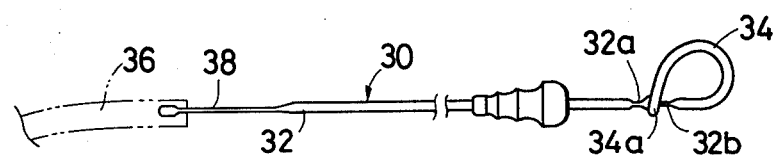
FIG. 4A
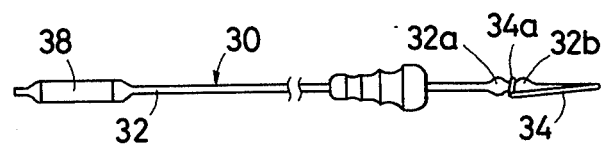
FIG. 4B
FIG. 5A 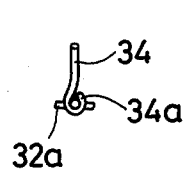    FIG. 5B 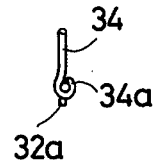    FIG. 6 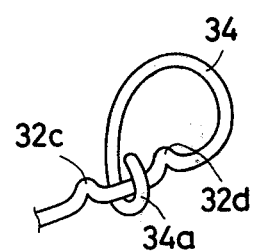
FIG. 7 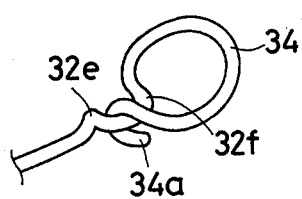    FIG. 8 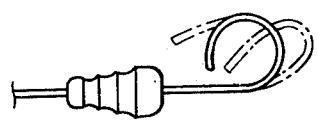

DIPSTICK

BACKGROUND OF THE INVENTION

This invention relates in general to dipsticks and more particularly to dipsticks which are to be fitted into dipstick guiding conduits having a curved portion or portions.

There have been proposed various dipsticks for use in measuring the level of the liquid in a container where the level cannot be checked directly with the eyes. Of these dipsticks, some are designed to be fitted into dipstick guiding conduits, such as in the case of automotive engine and transmission applications. That is, a known dipstick for automotive engines or transmissions is made of a steel bar material or materials and adapted such that when used to check the level of an oil it is inserted into a dipstick guiding conduit by a predetermined stroke and then pulled out to read the level by checking how it is wetted with the oil.

Referring to FIGS. 1 to 3 of the accompanying drawing of this application, some typical conventional dipsticks which are designed to be fitted into dipstick guiding conduits will be described:

FIG. 1 shows a dipstick 10 having a main body 12 and a handle portion 14 which are integrally formed of a single length of metal bar, e.g., a "SWRM" which is a standard mild steel round wire according to Japanese Industrial Standard, with a relatively large diameter d, e.g., 4.0 mm. This type dipstick 10 is adapted for use in straight dipstick guiding conduits and has an advantage that its handle portion 14 is rigid or stiff enough not to be deformed largely during its insertion into or pulling out of the associated dipstick guiding conduit. Furthermore, it has an advantage that it is less costly to manufacture due to its simple structure. However, this type dipstick 10 cannot be used in curved dipstick guiding conduits.

FIG. 2 shows another dipstick 18 having a main body 20 and a handle portion 22 which are formed as individual parts. The handle portion 22 is formed of a steel round bar with a relatively large diameter, so that the handle portion 22 is stiff enough not to be deformed largely by the force applied thereto when the dipstick 18 is inserted into or pulled out of the associated dipstick guiding conduit. The main body 20 is formed of a thin steel flat bar or a thin strip of steel sheets, so that the main body 20 is resiliently flexible in one direction, i.e., in the direction substantially perpendicular to its broader surfaces. The main body 20 and the handle portion 22 are joined together by rivets 24. With this structure, the dipstick 18 is insertable into curved dipstick guiding conduits of the kind which axially extend in one plane, i.e., two-dimensionally, since the main body 20 can flex in a manner as shown by the chain lines in the drawing to follow the associated curved dipstick guiding conduit. This type dipstick 18, however, has a disadvantage that it is more costly to manufacture for it requires two individual parts which are separately formed of different bar materials and assembled together thereafter. Furthermore, this type dipstick 18 cannot be used in such kind of curved dipstick guiding conduits that axially extend in two planes, i.e., three-dimensionally.

FIG. 3 shows a further dipstick 26 which is substantially simillar to that of FIG. 2 except that its main body 28 is adapted to be flexible in two directions. That is, as observed from the drawing, the main body 28 is twisted at the middle thereof to have such twisted form that the corresponding side surfaces of the upper and lower halves thereof (the left and right halves as viewed in the drawing) are substantially normal to each other. With this structure, the dipstick 26 is insertable into curved dipstick guiding conduits of the kind which axially extend in two planes, i.e., three-dimensionally. However, since each half of the main body 28 is flexible only in one direction and the flexible direction of each half of the main body 28 is fixed with respect to the flexible direction of the other half, this type dipstick 26 is not easy to handle. Furthermore, this type of dipstick 26 is much more costly to manufacture since it requires an increased number of manufacturing processes.

SUMMARY OF THE INVENTION

It is an object of the present invention to provide a novel and improved dipstick which is free from the foregoing drawbacks existing in the conventional dipsticks of the described types.

It is another object of the present invention to provide a novel and improved dipstick of the abovementioned character which is formed of a single length of wire and comprises a main body which is flexible in a multiplicity of directions to easily follow a complexly curved dipstick guiding conduit and a handle portion which is stiff enough not to be deformed largely during the handling of the dipstick.

It is a further object of the present invention to provide a novel and improved dipstick of the abovementioned character which is quite easy to handle.

It is a yet further object of the present invention to provide a novel and improved dipstick of the abovementioned character which is of reduced weight and requires a reduced number of manufacturing processes, thus effecting marked cost reduction.

In accordance with the present invention, there is provided a dipstick which is formed of a single length of wire and comprises a generally straight main body and a loop-shaped handle portion. The handle portion extends from the main body and terminates in an end which is fitted to the main body in such a manner as to be prevented from relative movement in the axial direction of the main body. By thus fitting the end of the handle portion to the main body, the stiffness of the handle portion is increased markedly. This allows the dipstick to be formed of a wire with a reduced cross-sectional area so that the main body possesses an increased flexibility. When the dipstick is formed of a suitable wire that is circular in cross section, relatively small in diameter and possesses a relatively high resilience, the main body is resiliently flexible in all directions to follow a complexly curved dipstick guiding conduit.

BRIEF DESCRIPTION OF THE DRAWINGS

These and other objects and advantages of the present invention will be made more apparent as this description proceeds, reference being had to the accompanying drawings, wherein:

FIG. 4A is a front elevation showing a dipstick according to the present invention;

FIG. 4B is a top plan view of the dipstick of FIG. 4A;

FIG. 5A is a fragmentary sectional view showing a part of the dipstick of FIGS. 4A and 4B;

FIG. 5B is a fragmentary sectional view showing a modification of the part of the dipstick of FIG. 5B;

FIG. 6 is a partially cutaway perspective view showing another embodiment of the present invention;

FIG. 7 is a partially cutaway perspective view similar to FIG. 6, showing a further embodiment of the present invention; and FIG. 8 is a partially cutaway elevational view showing the handle portion of a conventional dipstick, with dotted line showings indicating the deformed conditions of the handle portion during the insertion or pulling of the conventional dipstick into or out of an associated dipstick guiding conduit.

DETAILED DESCRIPTION OF THE PREFERRED EMBODIMENTS

Figure 1:
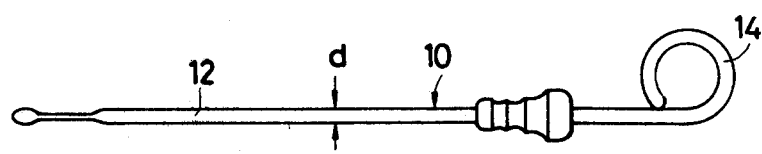
FIGS. 1 to 3 are elevational views showing conventional dipsticks with which the present invention is concerned.
Figure 2:
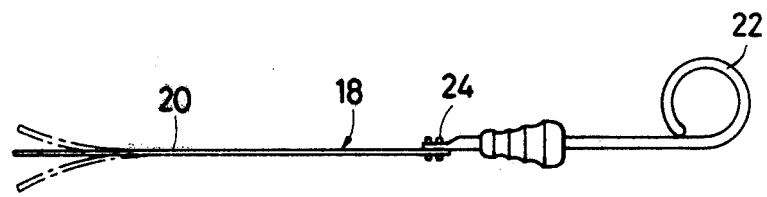
Figure 3:
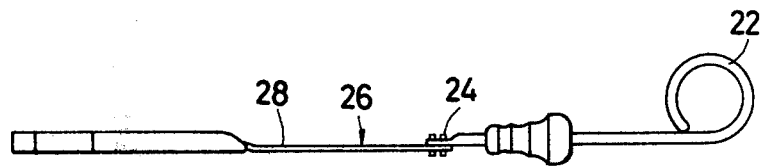

Referring first to FIGS. 4A and 4B, a preferred embodiment of this invention will be described. A dipstick 30 of this invention is formed of a single length of wire and comprises a generally straight main body 32 and a loop-shaped handle portion 34. The wire is substantially circular in cross section, relatively small in diameter and possesses a relatively high resilience, so that the main body 32 can resiliently flex to follow a curved dipstick guiding conduit 36. The main body 32 has a liquid level indicator portion 38 which is formed into a thin, flat shape by stamping to improve legibility of a liquid level indicated thereby. The handle portion 34, which is bent into a loop, extends from the main body 32 and terminates in an end 34a which is fitted to the main body 32 in such a manner as to be prevented from relative movement in the axial direction of the main body 32. Specifically, the main body 32 is provided with a pair of axially spaced stopper portions 32a and 32b which are formed into a thin, flat shape by stamping so as to project radially of the main body 32. The end 34a of the handle portion 34 is wound round the main body 32 between the stopper portions 32a and 32b, thereby being prevented from relative movement in the axial direction of the main body 32. In this instance, from the economical point of view, it is preferable to form the liquid level indicator portion 38 and the stopper portions 32a and 32b by the same stamping process.

In the embodiment of FIGS. 4A and 4B, the stopper portions 32a and 32b are constructed to have broader surfaces which are substantially perpendicular to the plane of the loop-shaped handle portion 34, as best shown in FIG. 5A. However, this is not essential and can be replaced by the structure of FIG. 5B, in which the broader surfaces of the stopper portions 32a and 32b are substantially parallel to the plane of the loop-shaped handle portion 32.

FIG. 6 shows another embodiment of this invention which is substantially simillar to the embodiment of FIGS. 4A and 4B except that a pair of bent portions 32c and 32d in the form of protuberances are provided in place of the stopper portions 32a and 32b of FIGS. 4A and 4B. The end 34a of the loop-shaped handle portion 34 is similarly wound round the main body 32 between the bent portions 32c and 32d and thereby substantially prevented from relative movement in the axial direction of the main body 32.

FIG. 7 shows a further embodiment of this invention which is substantially similar to the embodiment of FIGS. 4A and 4B except that a pair of bent portions 32e and 32f are provided in place of the stopper portions 32a and 32b of FIGS. 4A and 4B. As observed from the drawing, one bent portion 32e is formed in the main body 32 and the other bent portion is formed by the cooperation of the main body 32 and the handle portion 34. The bent portions 32e and 32f of the embodiment of FIG. 7 produces the same effect as the stopper portions 32a and 32b of FIGS. 4A and 4B.

While the connection between the end 34a of the handle portion 34 and the main body 32 has been described and shown as above, the end 34a of the handle portion 34 may be welded or otherwise fixed to the main body 32 without the provisions of such stopper portions 32a and 32b or the bent portions 32c and 32d or 32e and 32f, to produce the same effect.

The dipstick 30 thus constructed according to the present invention features that the end 34a of the handle portion 34 is fitted to the main body in such a manner as to be prevented from movement relative to the main body 32 in the axial direction thereof. This is quite advantageous in increasing the stiffness of the handle portion 34, thereby allowing the dipstick 30 to be formed of a wire with a reduced diameter so that the main body 32 possesses an increased flexibility.

The above feature is further effective in keeping the fingers of the operator from being pinched and injured during the handling of the dipstick 30, because the length of the wire defining the handle portion 34 is kept constant even when the handle portion 34 is deformed by the force applied thereto during the handling of the dipstick 30. In the case of a conventional dipstick of the type shown in FIG. 8, its handle portion is liable to be deformed during the handling as shown by the chain lines. Such deformations do not occur in the handle portion 34 of the dipstick 30 of this invention.

It is desirable for a wire material of which the dipstick 30 of this invention is formed to be circular in cross section, relatively small in diameter and possesses a relatively high resilience, so that the main body 32 can resiliently flex in all directions to easily follow a curved dipstick guiding conduit. Specifically, materials such as "SWRH", "SWRM" and "SUS 304" which are standard hard steel round wire, mild steel round wire and stainless steel according to Japanese Industrial Standard, respectively are desirable for the dipstick 30 of this invention.

The dipstick 30 of this invention can be made applicable to most dipstick guiding conduits if the diameter of the wire employed is so small as to allow it to be resiliently bent into a curved shape with a radius of curvature of as small as about 300 mm. From this fact, the wire diameter for the dipstick 30 of this invention can be as large as about 3.5 mm when a wire of "SWRM" is employed. When a wire of "SWRM" with a diameter of 3.5 mm is employed, the dipstick 30 can be resiliently bent into a curved shape with a radius of curvature of as large as about 282 mm.

The wire diameter for the dipstick 30 may be smaller to any extent as far as the quantity of deformation of the handle portion 34 during the handling is below the allowable level. Specifically, when a wire of "SWRH" is employed, the wire diameter for the dipstick 30 of this invention can be as smaller as about 0.5 mm. However, in the case of "SWRH" or "SUS 304", it is preferable to have the wire diameter ranging from 1.5 mm to 2.5 mm.

From the foregoing description, it is to be understood that a dipstick according to the present invention can flex in all directions to easily follow a complexly curved dipstick guiding conduit since it is formed of a wire which is circular in cross section, relatively small in diameter and possesses a relatively high resilience.

It is further to be understood that a dipstick according to the present invention comprises a loop-shaped handle portion which is prevented from being varied in the circumference of the loop, thus keeping the fingers of the operator from being pinched and injured during the handling.

It is still further to be understood that a dipstick according to the present invention effects marked weight reduction and is adapted to be manufactured through a reduced number of manufacturing processes.

It is yet further to be understood that a dipstick according to the present invention is particularly benificial when employed for automotive engine and transmission applications since automotive engines or transmissions tend to require complexly curved dipstick guiding conduits.

What is claimed is:

1. A dipstick for an automotive engine or transmission having an oil reservoir and a curved dipstick guiding conduit communicating with said reservoir, said dipstick being formed of a single length of wire and comprising:

a generally straight main body;

a handle portion bent into a loop, extending from said main body and terminating in an end fitted to said main body;

said main body including a pair of axially spaced stopper portions which are formed into a thin, flat shape so as to project radially of said main body;

the fitting end of said handle portion being wound round said main body between said stopper portions so as to be prevented from relative movement in the axial direction of said main body; and said wire being circular in cross-section, relatively small in diameter and possessing a relatively high resilience so that said main body can resiliently flex in all directions to easily follow said curved dipstick guiding conduit.

* * * * *